(12) United States Patent
Blancke et al.

(10) Patent No.: US 12,721,277 B2
(45) Date of Patent: Sep. 1, 2026

(54) GRASS PICKUP HEADER

(71) Applicant: CNH Industrial Belgium N.V., Zedelgem (BE)

(72) Inventors: Jeffrey Blancke, Markegem (BE); Stijn Van Belleghem, Maldegem (BE)

(73) Assignee: CNH Industrial Belgium N.V., Zedelgem (BE)

( * ) Notice: Subject to any disclaimer, the term of this patent is extended or adjusted under 35 U.S.C. 154(b) by 381 days.

(21) Appl. No.: 18/542,157

(22) Filed: Dec. 15, 2023

(65) Prior Publication Data

US 2024/0206399 A1 Jun. 27, 2024

(30) Foreign Application Priority Data

Dec. 27, 2022 (EP) .................................... 22216842

(51) Int. Cl.
*A01D 89/00* (2006.01)

(52) U.S. Cl.
CPC ......... *A01D 89/008* (2013.01); *A01D 89/002* (2013.01)

(58) Field of Classification Search
CPC ....... A01F 15/10; A01D 89/00; A01D 89/001; A01D 89/006; A01D 89/002; A01D 89/008
See application file for complete search history.

(56) References Cited

U.S. PATENT DOCUMENTS 2,256,829 A * 9/1941 Hyman ................ A01D 89/002 56/364
3,226,921 A * 1/1966 Shepley ................. A01D 57/02 53/341
6,314,708 B1 11/2001 Engel
6,688,092 B2 2/2004 Anstey et al.
7,478,523 B2 1/2009 Mcclure et al.
(Continued)

FOREIGN PATENT DOCUMENTS

CN 114568132 A 6/2022
DE 8028347 U1 2/1981
(Continued)

OTHER PUBLICATIONS

Extended European Search Report for European Application No. 22216842.9, dated Jun. 5, 2023 (Jun. 5, 2023)—8 pages.

*Primary Examiner* — Adam J Behrens
(74) *Attorney, Agent, or Firm* — CM Law PLLC; Stephen J. Weed

(57) ABSTRACT

The pickup header comprises a header frame and one or more reel assemblies. Each reel assembly comprises a reel provided with a plurality of pickup tines, and further comprises a plurality of tine guides for guiding the tines at the back of the reel assembly. One or more of said tine guides comprises an upright wall portion having a concave front edge, wherein along at least the upper half of said front edge, the tine guide further comprises a ridge portion that extends laterally outward from the wall portion. The ridge portion realizes improved guidance of deformed or bent tines compared to existing designs, so that such tines are forced to move within a desired path, without interfering with adjacent tines. The one or more tine guides may be provided in the form of integrally formed pieces obtainable by injection molding or casting.

20 Claims, 3 Drawing Sheets

(56) References Cited

U.S. PATENT DOCUMENTS

| | | | | |
|---|---|---|---|---|
| 8,181,435 | B1 * | 5/2012 | McClure | A01D 89/002 56/364 |
| 9,578,809 | B2 * | 2/2017 | Reiter | A01D 89/002 |
| 10,225,985 | B2 * | 3/2019 | Cox | A01D 89/001 |
| 11,343,968 | B2 | 5/2022 | Remillard | |
| 11,980,137 | B2 * | 5/2024 | Williams | A01F 15/10 |
| 2003/0110752 | A1 * | 6/2003 | Dow | A01D 89/00 56/364 |
| 2006/0242937 | A1 * | 11/2006 | Pourchet | A01D 89/002 56/219 |
| 2009/0320434 | A1 * | 12/2009 | Pourchet | A01D 89/002 56/364 |

FOREIGN PATENT DOCUMENTS

| | | | | |
|---|---|---|---|---|
| DE | 3317484 | A1 | 11/1984 | |
| DE | 3518458 | A1 | 11/1986 | |
| DE | 3340685 | C2 | 12/1988 | |
| DE | 102018121277 | A1 | 3/2020 | |
| DE | 102020107031 | A1 * | 9/2021 | A01D 89/002 |
| EP | 3763196 | A1 * | 1/2021 | A01D 89/002 |

* cited by examiner 29
27
16
20a
26
23
20b
24
26
20c
25
28

GRASS PICKUP HEADER

CROSS REFERENCE TO RELATED APPLICATION

This application claims priority to European Patent Application Serial No. 22216842.9 filed on Dec. 27, 2022, the contents of which are incorporated fully herein by reference.

FIELD OF THE INVENTION

The present invention is related to agricultural machinery, in particular to a grass pickup header. This is a tool that is attachable to a towed or a self-driven agricultural vehicle such as a baler or a forage harvester, for picking up swathes of previously cut grasses from a field.

STATE OF THE ART

A well-known type of grass pickup header as presently known in the state of the art comprises a rotatable reel configured to rotate about an axis oriented transversally to the driving direction, and provided with tine bars, with spring-mounted tines attached to the tine bars at regular distances, and forced by the rotation of the reel to perform an upward gathering movement for picking up grass at the front of the reel. Picked-up grass is then transferred to a rotatable auger which moves the grass towards a central area from where it is further transferred to the agricultural vehicle at the front of which the header is attached. The vehicle may be a forage harvester or a baler.

At the front of the reel, the tines move between curved tine guards which are C-shaped strips attached to the frame of the reel. The reel is tube-shaped, with the interior of the C-shape of the tine guards closely following the front curvature of the reel. At the back of the reel, the tines are guided between tine guides. The combination of tine guards and tine guides is configured to maintain the tines in a desired vertical path and to prevent interferences between tines when one or more of the tines are bent or otherwise deformed out of the vertical plane due to the interaction with crops or foreign objects.

Another type of grass pickup is known as a combine grass pickup that is attachable to a combine harvester. It comprises a different kind of reel that has a more elongate shape as seen in a vertical cross-section. The reel is also provided with tines moving along a revolving trajectory that follows the elongate shape. No tine guards are present at the front, but at the back, tine guides perform the function of guiding the tines along the rear end of the trajectory, as in the other header type.

In many pickup designs known today, the tine guides at the back of the reel are integrally formed with the reel frame, which makes this frame a complex and expensive piece. Moreover, these frame-integrated tine guides often exhibit many areas where deformed tines can become stuck or break. Replaceable tine guides have been proposed as well, as illustrated for example by patent publication document U.S. Pat. No. 8,181,435B1. This particular solution provides tine guides made of plate steel and attachable by hooks and notches to the reel frame. However, the plate steel elements are relatively far apart along most of their height, so that the guidance of tines which are deformed or bent is not optimal with this design and the risk of adjacent tines moving too much out of their dedicated path remains high.

SUMMARY OF THE INVENTION

The invention aims to solve the problems highlighted in the previous section. This aim is achieved by a pickup header and a tine guide as described in the appended claims.

A pickup header according to the invention comprises a number of well-known components, including a header frame and one or more reel assemblies. Each reel assembly comprises a reel provided with a plurality of pickup tines, and further comprises a plurality of tine guides for guiding the tines at the back of the reel assembly. According to embodiments of the header, the at least one reel assembly comprises a rotatable tube-shaped reel provided with multiple rows of tines attached to parallel tine bars and a plurality of C-shaped tine guards at the front of the assembly for guiding the tines in the spaces between adjacent tine guards. The C-shaped tine guards closely follow the curvature of the tube-shaped reel at the front thereof. According to other embodiments, the header is a combine grass pickup header, comprising a reel assembly that includes a reel provided with tines configured to revolve along a trajectory having an elongate shape as seen in a vertical cross section, and wherein the reel assembly comprises tine guides for guiding the tines along the rear part of the trajectory.

In a header according to the invention, one or more of the tine guides comprises an upright wall portion having a concave front edge, wherein along at least the upper half of the front edge, the tine guide further comprises a ridge portion that extends laterally outward from the wall portion on both sides thereof. The ridge portion realizes improved guidance of deformed or bent tines compared to existing designs, so that such tines are forced to move within a desired path, without interfering with adjacent tines and/or with parts of the header frame. The wall portion may be a closed wall portion, preventing tines from becoming stuck along the rear part of their trajectory. According to an embodiment of the invention, the one or more tine guides are provided in the form of integrally formed pieces obtainable by injection molding or casting.

DETAILED DESCRIPTION OF PREFERRED EMBODIMENTS OF THE INVENTION

Embodiments will now be described with reference to the drawings. The detailed description is not limiting the scope of the invention, which is defined only by the appended claims.

Figure 1:
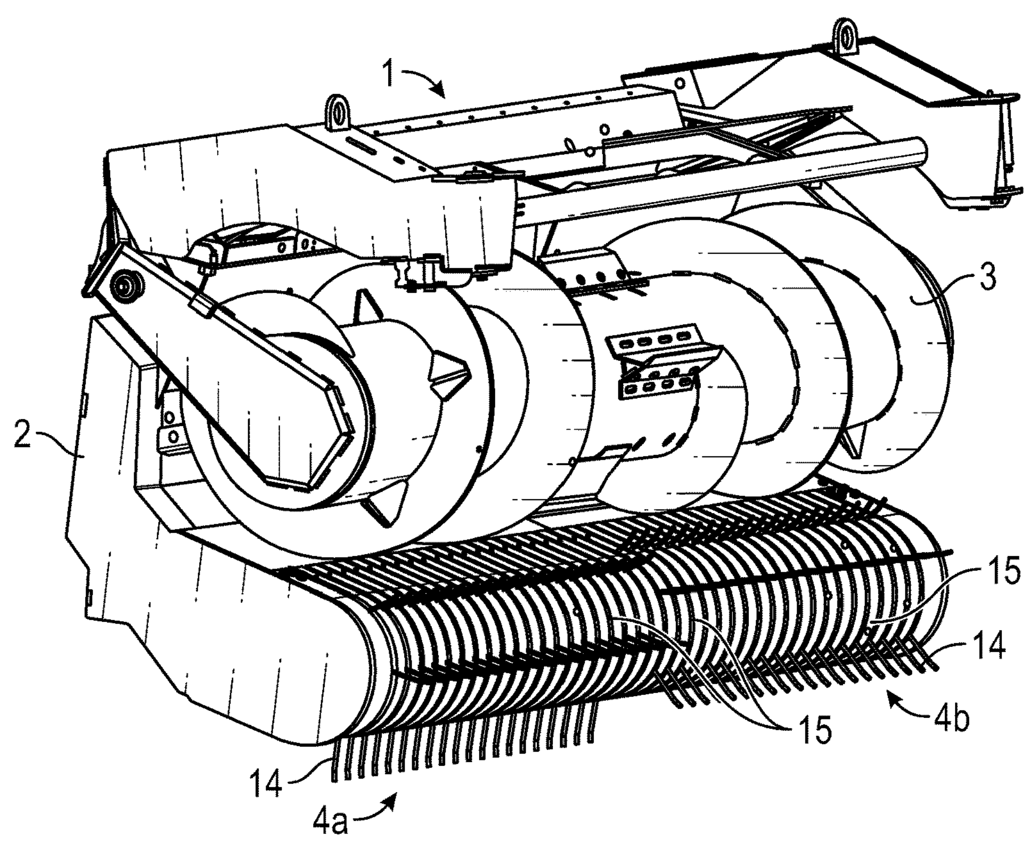
FIG. 1 is a 3D view of a pickup header in accordance with an embodiment of the invention.

A pickup header 1 in accordance with an embodiment of the invention is shown in FIG. 1. The header comprises a header frame 2 onto which an auger 3 is rotatably mounted. The frame 2 further supports two adjacent reel assemblies 4*a* and 4*b*. One of the reel assemblies is shown in a transparent side view in FIG. 2. The reel assembly comprises a rotatable reel formed of a central shaft 10 and a plurality of vertical plates 11 fixed to the shaft 10. For picking up grass, the reel rotates in the direction of the arrow included in FIG. 2. A plurality of tine bars 12 are connected to the vertical plates 11 via rotational bearings 13 so that the tine bars 12 are pivotable about their central axes relative to the vertical plates 11. The rotation of the central shaft 10 may be actuated by a suitable drive mechanism (not shown), for example a chain or belt drive mounted between the two reel assemblies 4*a* and 4*b*. Each tine bar 12 supports a row of spring-mounted tines 14 extending in essentially vertical planes oriented perpendicularly to the central shaft 10. In most pickup headers known today, and preferably also in a header according to the invention, a cam track mechanism (not shown in the drawings) forces the tine bars 12 to undergo a rocking movement during rotation of the central shaft 10, so that the tines 14 move along a predefined revolving trajectory aimed at picking up grass at the front of the pick-up, moving the gras upwards and transferring it to the auger 3. In operation, a roller windguard is furthermore connected between support arms at the front of the header frame, for compacting crops before they are picked up by the reel assemblies. This roller windguard is not shown in the view in FIG. 1 as it has no direct relevance for the present invention.

Guidance of the tines 14 at the front side of the reel assemblies is realized through C-shaped tine guards 15, which also assist in guiding the crops towards the auger 3. These tine guards 15 are fixed to the frame structure with gaps in between adjacent guards, through which gaps the tines 14 are protruding as they move along the front side of their revolving trajectory. It is seen in FIG. 1 that there is a timing difference between the tines of the two reel assemblies; otherwise, these assemblies are identical to each other.

All components described so far are well-known in the art and may be realized in accordance with any known design. At the back of the reel assemblies, the tines 14 are guided between tine guides 16 which are in accordance with an embodiment of the present invention. One of these tine guides 16 is visible in the side view presented in FIG. 2.

Figure 2:
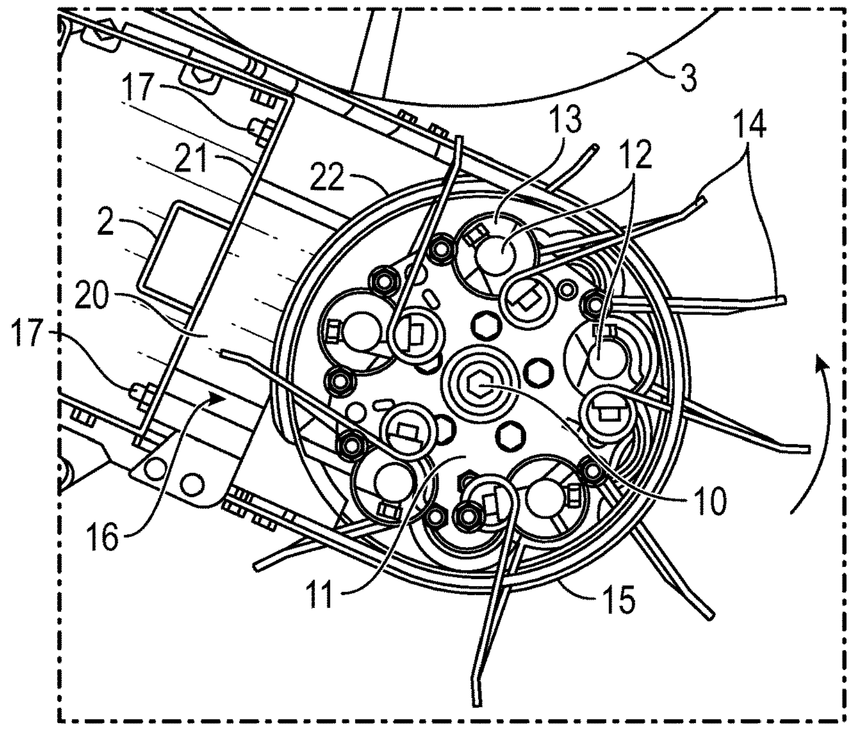
FIG. 2 is a transparent side view of one of the reel assemblies of the header shown in FIG. 1.
Figure 3:
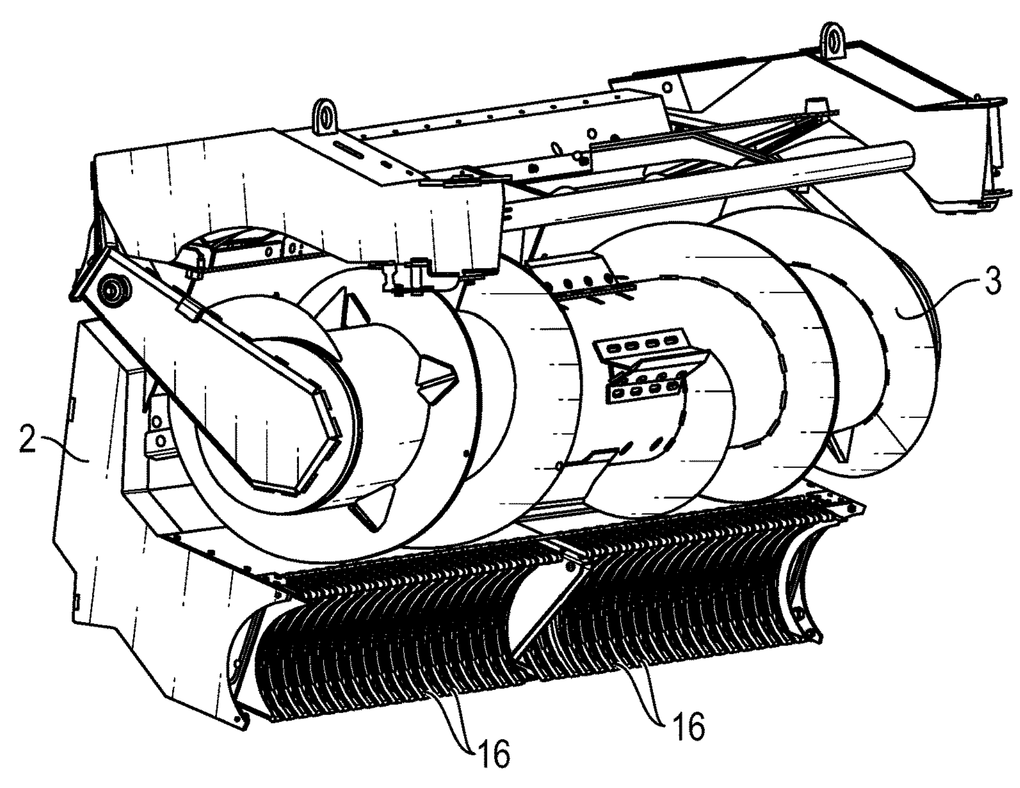
FIGS. 3 and 4 are different views of the header of FIG. 1, with the reel and the tine guards removed.
Figure 4:
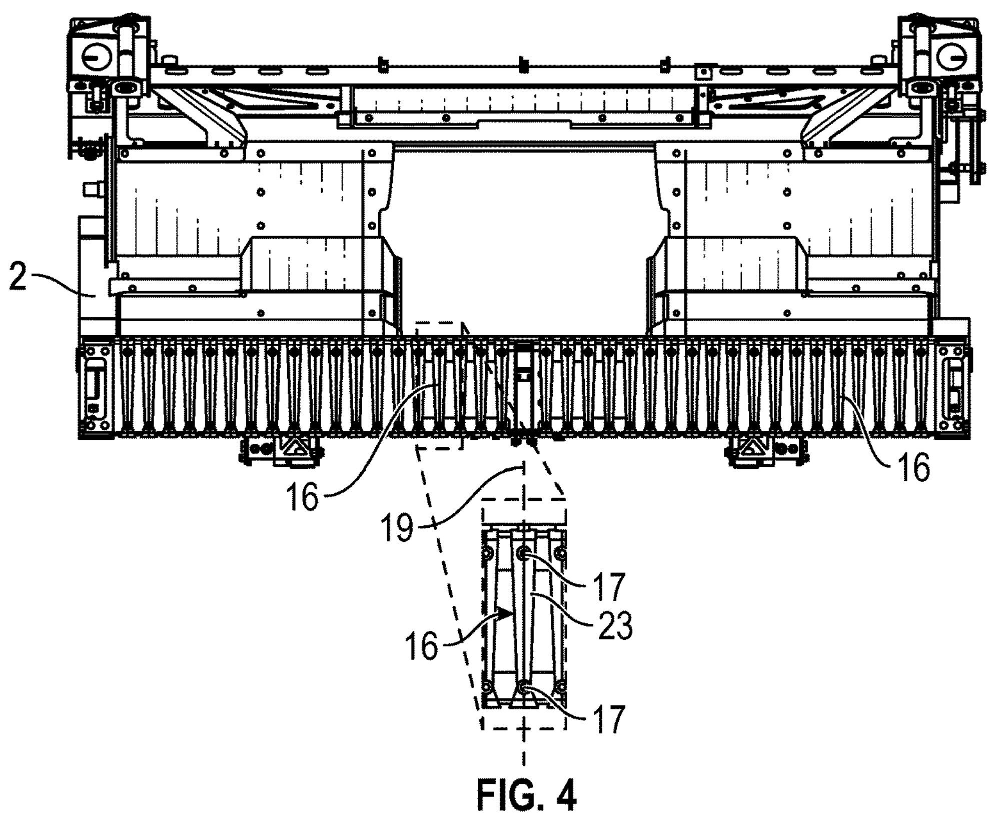

FIGS. 3 and 4 illustrate the pickup header in a 3D view and a front view respectively, with the reels and the C-shaped tine guards removed. It is seen that the tine guides 16 in accordance with the invention are mounted side by side along the width of each of the reel assemblies, each tine guide being fixed to the header frame 2 by two bolts 17 (also indicated in FIG. 2) oriented in the back-to-front direction of the header. In each of the reel assemblies 4*a* and 4*b*, the gaps between each pair of adjacent tine guides 16 is aligned to a corresponding gap between two adjacent C-shaped tine guards 15 so that the tines 14 are guided along their complete trajectory.

Figures 5A, 5B:
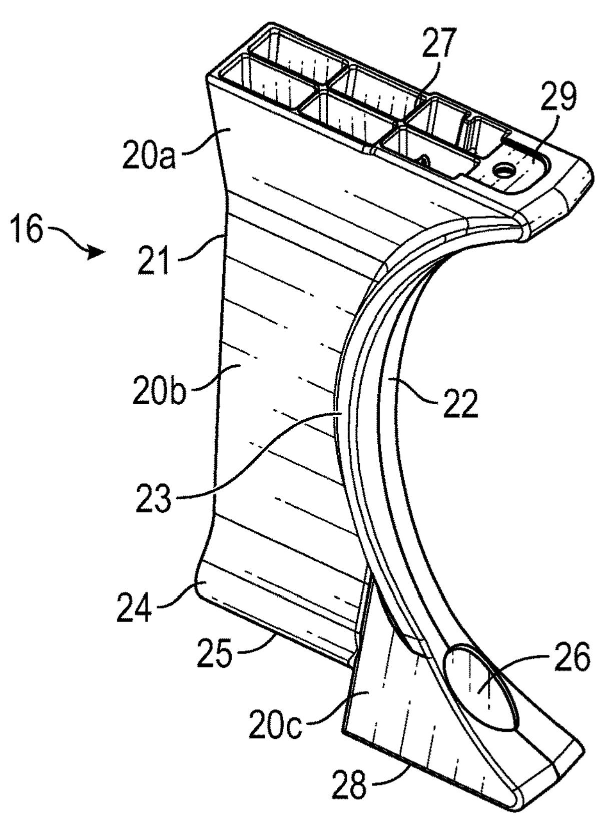
FIGS. 5*a* and 5*b* are 3D images of a tine guide in accordance with an embodiment of the invention.

A detailed image of one tine guide 16 in accordance with a preferred embodiment is shown in FIGS. 5*a* and 5*b*. According to this particular embodiment, the tine guide 16 is an integral piece formed of synthetic material and fabricated by an injection molding process. One suitable material is high density polyethylene also known by its abbreviation HDPE. The tine guide 16 comprises an upright wall portion 20 having a straight rear edge 21 and a concave front edge 22 (see also FIG. 2). The curvature of the concave front edge 22 is configured so that the aligned edges 22 of the adjacent tine guides 16 enable the positioning of the reel 10/11/12 in the half-space delimited by the concave edges 22. The straight back edge 21 is configured to be mounted against a straight wall surface of the header frame, as seen in FIG. 2.

With reference to FIGS. 5*a* and 5*b*, it is seen that the concave front edge 22 is furthermore provided with a ridge portion 23 extending laterally on both sides of the wall portion 20 along a large part of the curved front edge 22, starting from the top of the tine guide 16. In the embodiment shown, and best visible in FIG. 4, the ridge 23 portion is wider at the top and becomes gradually more narrow until reaching its lowest width in the vicinity of the lower of the bolts 17. With reference to the enlarged detail in FIG. 4, it is seen that the ridge portion 23 is preferably symmetrically arranged on either side of the tine guide's central vertical plane 19.

Now referring again to FIGS. 5*a* and 5*b*, the wall portion 20 comprises a top part 20*a* having diverging sidewalls in the shape of an upward-oriented V, a central part 20*b* having a constant thickness apart from a tube-shaped lower end portion 24, and a base part 20*c*. The ridge portion 23 extends from the top of the tine guide 16 approximately to the location of the tube-shaped end portion 24, i.e., the ridge portion 23 extends along more than half of the length of the concave front edge 22.

The base part 20*c* has a triangle-like shape as seen in the side view, with the continuation of the concave front edge 22 forming the front side of the triangle. The base part 20*c* furthermore has slightly diverging sidewalls as seen in the front view in FIG. 4, the sidewalls diverging in the shape of a downward oriented V. It is seen that the base part 20*c* is placed in front of and partly overlapping the central part 20*b*, leaving a gap 25 underneath the tube-shaped lower end 24. The presence of the gap 25 is advantageous for avoiding crop accumulation in this area.

Back-to-front holes 26 are provided through the V-shaped top part 20*a* and through the base part 20*c* and the tube-shaped lower end 24, for the passage of the bolts 17.

The top plane 27, the V-shaped top part 20*a* and the bottom plane 28 of the base part 20*c* are essentially parallel to each other, forming at the same time the top and bottom planes of the tine guide 16 as such. These planes can however be non-parallel in other embodiments. A hole and threaded insert 29 is provided in the top plane 27, and one or more similar holes and inserts (not shown) are provided in the bottom plane 28. When the tine guides are in place, the holes and threaded inserts in the top and bottom planes 27, 28 of each tine guide 16 enable attaching the ends of a C-shaped tine guard 15 by bolt connections to the top and bottom planes. According to preferred embodiments, the tine guards 15 are flexible strips folded in the form of a 'C'. In this case, the replacement of a tine guide 16 requires releasing only one bolt connection at the top which enables the tine guard 15 to unfold, thereby enabling access to the two bolts 17 on the front side of the tine guide 16, without removing the reel. According to other embodiments, the C-shaped tine guards are pre-formed metal profiles. In this case, the tine guard needs to be removed completely, after which the corresponding tine guide 16 can be removed, also without removing the reel.

In operation, the tines 14 ideally remain straight so that each tine moves essentially in a vertical plane. However due to interactions with lumps of grass or foreign objects, the tines may become bent or otherwise deformed. This represents a risk of breakage of the tines, for example when a bent tine interferes with a neighbouring tine or becomes stuck. The ridge portions 23 on the tine guides 16 are configured to force such deformed tines into the desired essentially vertical path. The fact that this ridge portion 23 extends laterally outward on both sides from the wall portion, i.e. is wider than the wall portion 20, contributes to this effect, by reducing the distance between the front sides of adjacent tine guides. In the preferred embodiment shown, the width of the ridge portion gradually decreases to a minimum at the transition to the base part 20*c* which itself has a cross section that is widened downward in the form of a downward oriented V. Other width profiles may however be implemented according to other embodiments. For example, the base part 20*c* could have a constant width, and the ridge portion 23 could continue to the bottom plane 28 of the tine guide and become wider towards the bottom plane.

The invention also extends to tine guides 16 provided with a ridge portion 23, but which have no widening V-shaped parts at the top and bottom area, or wherein a widening V-shaped part is present only at the top or only at the bottom of the tine guide.

In a pickup header according to the invention, preferably all the tine guides are the same, and in accordance with an embodiment of the invention. Nevertheless, tine guides according to different embodiments of the invention may be used together in the same pickup header, for example tine guides having different shapes and/or thicknesses of the wall portion parts 20*a*-20*c*. It is also possible to apply one or more but not all the tine guides (in the same header) in accordance with the invention, and others in accordance with a design known from the prior art.

According to embodiments of the invention, one or more adjacent tine guides according to the invention are connected together, for example by one or more horizontal strips along the straight rear edges 21 of the tine guides. Such connections could even be integral with the tine guides so that a set of adjacent tine guides are forming one continuous element. A header provided with tine guides according to such an embodiment is to be considered as a header comprising a plurality of tine guides in accordance with the invention. In other words, the interconnected tine guides operate the same as in the case where the tine guides are provided as separate pieces.

The wall portion 20 is preferably a closed wall portion as shown in the illustrated embodiment, i.e. there are no openings in the wall portion 20, which ensures that tines 14 that are bent out of shape do not get stuck in the area behind the curved front edge 22 of the tine guides 16. The V-shaped top part 20*a* ensures adequate guidance of the tines when the reel is operated in the reverse direction. This can be useful when a blockage occurs in the header. The reverse operation enables returning the last picked-up grass to the field, which facilitates the inspection of the reel assembly. The invention is however not limited to headers provided with this reverse-operating capability.

In the embodiments described above, the tine guides 16 are integrally formed components obtainable by injection molding of a synthetic material or casting of a suitable material such as a metal. The invention is not limited to this and encompasses also tine guides formed for example of plate steel and comprising a plate steel ridge portion at the front and welded to an upright wall portion. The use of injection molding or casting for producing the tine guides however enables a more intricate shape at a lower cost compared to plate steel elements. The optimization in terms of the shape and width of the ridge profile is therefore preferably done using such injection molded or cast tine guides, with a further preference in terms of cost for injection molded plastic materials such as HDPE.

The invention is not only related to a pickup header as illustrated in the drawings, i.e. a pickup header provided with the rotatable tube-shaped reel comprising the plates 11 and tine bars 12, and the C-shaped tine guards at the front. The invention is also related to a combine pickup header, comprising one or more tine guides in accordance with any one of the above-described embodiments. As stated above, such a combine pickup header is not provided with C-shaped tine guards at the front. The reel has a more elongate shape, with tines moving along a trajectory that follows the elongate shape. At the back of the reel, tine guides according to any embodiment of the invention can be mounted for guiding the tines along the rear of the trajectory, in the same way as described above for the other header type.

The invention claimed is:

1. A pickup header that picks up a swath of grass from a field when attached to an agricultural vehicle, the pickup header comprising:
- a header frame; and
- a reel assembly, the reel assembly including:
  - a reel comprising a plurality of pickup tines, and
  - a plurality of adjacent tine guides at a back of the reel assembly and removably attached to the header frame, at least one of the tine guides comprising a wall portion having a concave front edge and a ridge portion extending laterally outward on both sides of the wall portion that defines a width profile along at least an upper half of the concave front edge, the width profile of the ridge portion decreasing along at least a portion of the concave front edge.

2. The pickup header of claim 1, wherein the at least one tine guide comprises integral pieces obtainable by injection molding or casting.

3. The pickup header of claim 1, wherein the ridge portion extends symmetrically with respect to a vertical center plane of the at least one tine guide.

4. The pickup header of claim 1, wherein the width profile of the ridge portion is widest at a top of the at least one tine guide and gradually becomes narrower in a downward direction.

5. The pickup header of claim 1, wherein the wall portion comprises a top part, a central part, and a base part; and
- wherein at least one of the top part or the base part becomes gradually wider starting from the thickness of the central part towards an upper or lower end of the wall portion.

6. The pickup header of claim 5, wherein the central part has a constant thickness.

7. The pickup header of claim 6, wherein the base part is placed in front of and partially overlapping the central part, such that a gap remains behind the base part, between the central part and the lower end of the base part.

8. The pickup header of claim 1, wherein the at least one tine guide is attached to the header frame by at least two bolt connections oriented in a front-to-back direction of the pickup header.

9. The pickup header of claim 8, wherein the bolt connections are accessible without removing the reel.

10. The pickup header of claim 1, wherein the at least one tine guide has a top plane and a bottom plane;
- wherein the header comprises a plurality of C-shaped tine guards at the front of the reel assembly; and
- wherein at least one of the C-shaped tine guards are connected to the top and bottom planes of respective ones of the at least one tine guide.

11. The pickup header of claim 10, wherein the at least one tine guard is formed of flexible strips.

12. The pickup header of claim 1, wherein the wall portion has a straight back edge on an opposite side of the concave front edge.

13. The pickup header according to claim 1, wherein the at least one tine guide is formed of injection molded plastic.

14. The pickup header according to claim 1, wherein the at least one tine guide comprises a plurality of adjacent tine guides attached to each other.

15. A tine guide usable in a pickup header at a back of a reel assembly, the tine guide comprising:

a wall portion having a concave front edge; and a ridge portion extending laterally outward on both sides of the wall portion that defines a width profile along at least an upper half of the concave front edge, the width profile of the ridge portion decreasing along at least a portion of the concave front edge;

wherein the tine guide is removably attached to a header frame.

16. The tine guide of claim 15, wherein the tine guide comprises integral pieces obtainable by injection molding or casting.

17. The tine guide of claim 15, wherein the ridge portion extends symmetrically with respect to a vertical center plane of the tine guide.

18. The tine guide of claim 15, wherein the width profile of the ridge portion is widest at a top of the tine guide and gradually becomes narrower in a downward direction.

19. The tine guide of claim 15, wherein the wall portion comprises a top part, a central part and a base part; and wherein at least one of the top part or the base part becomes gradually wider starting from the thickness of the central part towards an upper or lower end of the wall portion.

20. The tine guide of claim 15, wherein the tine guide is attached to the header frame by at least two bolt connections oriented in a front-to-back direction of the pickup header.

* * * * *